US012233432B2

(12) United States Patent
Naito et al.

(10) Patent No.: US 12,233,432 B2
(45) Date of Patent: Feb. 25, 2025

(54) COATING APPARATUS AND COATING METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Katsuyuki Naito, Bunkyo Tokyo (JP); Naomi Shida, Minato Tokyo (JP); Kohei Nara, Yokohama Kanagawa (JP); Takahiro Kokubo, Hiratsuka Kanagawa (JP); Hiroaki Hirazawa, Kawasaki Kanagawa (JP); Yutaka Saita, Yokohama Kanagawa (JP)

(73) Assignees: KABUSHIKI KAISHA TOSHIBA (JP); TOSHIBA ENERGY SYSTEMS & SOLUTIONS CORPORATION (JP)

( * ) Notice: Subject to any disclaimer, the term of this patent is extended or adjusted under 35 U.S.C. 154(b) by 283 days.

(21) Appl. No.: 17/670,843

(22) Filed: Feb. 14, 2022

(65) Prior Publication Data

US 2022/0161292 A1 May 26, 2022

Related U.S. Application Data

(63) Continuation of application No. PCT/JP2020/029742, filed on Aug. 4, 2020.

(51) Int. Cl.
*B05C 9/06* (2006.01)
*B05B 7/24* (2006.01)
(Continued)

(52) U.S. Cl.
CPC .............. *B05C 9/06* (2013.01); *B05B 7/2491* (2013.01); *B05C 5/027* (2013.01); *B05C 11/04* (2013.01); *B05D 1/26* (2013.01)

(58) Field of Classification Search
None
See application file for complete search history.

(56) References Cited

U.S. PATENT DOCUMENTS 4,993,353 A 2/1991 Ogasawara et al.
7,779,777 B2 * 8/2010 Shiobara ........... H01L 21/67253 239/113

(Continued)

FOREIGN PATENT DOCUMENTS

CN 209577149 U 11/2019
EP 1 306 138 A2 5/2003

(Continued)

OTHER PUBLICATIONS

Extended EP Search Report for European patent application No. 20947808.0 dated Apr. 26, 2024 (9 pages).

*Primary Examiner* — Jethro M. Pence
(74) *Attorney, Agent, or Firm* — FOLEY & LARDNER LLP

(57) ABSTRACT

According to one embodiment of the invention, a coating apparatus includes a first pipe, a first pump, a first nozzle, a second nozzle, and a holder. The first pipe includes a first inflow port, a first outflow port, and a second outflow port. The first pump is configured to supply liquid toward the first inflow port. The first nozzle includes a first nozzle inflow port and a first nozzle discharge port. The first nozzle inflow port is connected to the first outflow port. The first nozzle discharge port is configured to discharge the liquid passing through the first pipe. The second nozzle includes a second nozzle inflow port and a second discharge port. The second nozzle inflow port is connected to the second outflow port. The second nozzle discharge port is configured to discharge the liquid passing through the first pipe. The holder holds the first nozzle and the second nozzle. The holder is configured to form a first state and a second state. In the first state, a (Continued)

height of the first nozzle discharge port and a height of the second nozzle discharge port are not less than a height of the first pipe. In the second state, the height of the first nozzle discharge port and the height of the second nozzle discharge port are lower than the height of the first pipe.

19 Claims, 9 Drawing Sheets

(51) Int. Cl.

| | |
|---|---|
| ***B05C 5/02*** | (2006.01) |
| ***B05C 11/04*** | (2006.01) |
| ***B05D 1/26*** | (2006.01) |

(56) References Cited

U.S. PATENT DOCUMENTS

| | | | | |
|---|---|---|---|---|
| 8,499,713 | B2 * | 8/2013 | Nakazawa | B05D 3/002 118/63 |
| 9,327,312 | B2 * | 5/2016 | Kim | B32B 37/24 |
| 9,468,161 | B2 * | 10/2016 | Nye | A01G 25/02 |
| 10,603,921 | B2 * | 3/2020 | Hara | B41J 2/18 |
| 10,612,143 | B2 * | 4/2020 | Komori | C23C 16/14 |
| 11,691,172 | B2 * | 7/2023 | Nobukuni | H01L 21/67017 137/334 |
| 11,697,289 | B2 * | 7/2023 | Goto | B41J 2/0454 347/89 |
| 11,707,762 | B2 * | 7/2023 | Carstens | B05B 3/026 222/198 |
| 11,826,772 | B2 * | 11/2023 | Burns | B05B 7/2472 |
| 2010/0039461 | A1 | 2/2010 | Kusunoki | |
| 2012/0188316 | A1 | 7/2012 | Matsuoka et al. | |
| 2020/0078812 | A1 | 3/2020 | Shi et al. | |
| 2020/0139720 | A1 * | 5/2020 | Goto | B41J 2/175 |
| 2022/0048062 | A1 * | 2/2022 | Shin | B05C 5/027 |

FOREIGN PATENT DOCUMENTS

| | | | |
|---|---|---|---|
| EP | 2 711 088 | | 3/2014 |
| JP | S62-095171 | | 5/1987 |
| JP | H04-090871 | A | 3/1992 |
| JP | H11-128817 | A | 5/1999 |
| JP | 2008-178820 | A | 8/2008 |
| JP | 2009-028638 | A | 2/2009 |
| JP | 2010-042614 | A | 2/2010 |
| JP | 4749141 | B2 | 8/2011 |
| JP | 2012-152972 | A | 8/2012 |
| JP | 5196557 | B2 | 5/2013 |
| JP | 2016-174992 | A | 10/2016 |
| JP | 2018-037347 | A | 3/2018 |
| JP | 2018-156858 | A | 10/2018 |
| WO | WO-2012/157434 | A1 | 11/2012 |

* cited by examiner

COATING APPARATUS AND COATING METHOD

CROSS-REFERENCE TO RELATED APPLICATIONS

This is a continuation application of International Application PCT/3P2020/029742, filed on Aug. 4, 2021; the entire contents of which are incorporated herein by reference.

FIELD

Embodiments described herein relate generally to a coating apparatus and a coating method.

BACKGROUND

There is a coating head that coats a liquid by using a coating bar. A coating apparatus that can form a uniform coated film is desirable.

DETAILED DESCRIPTION

Figure 1:
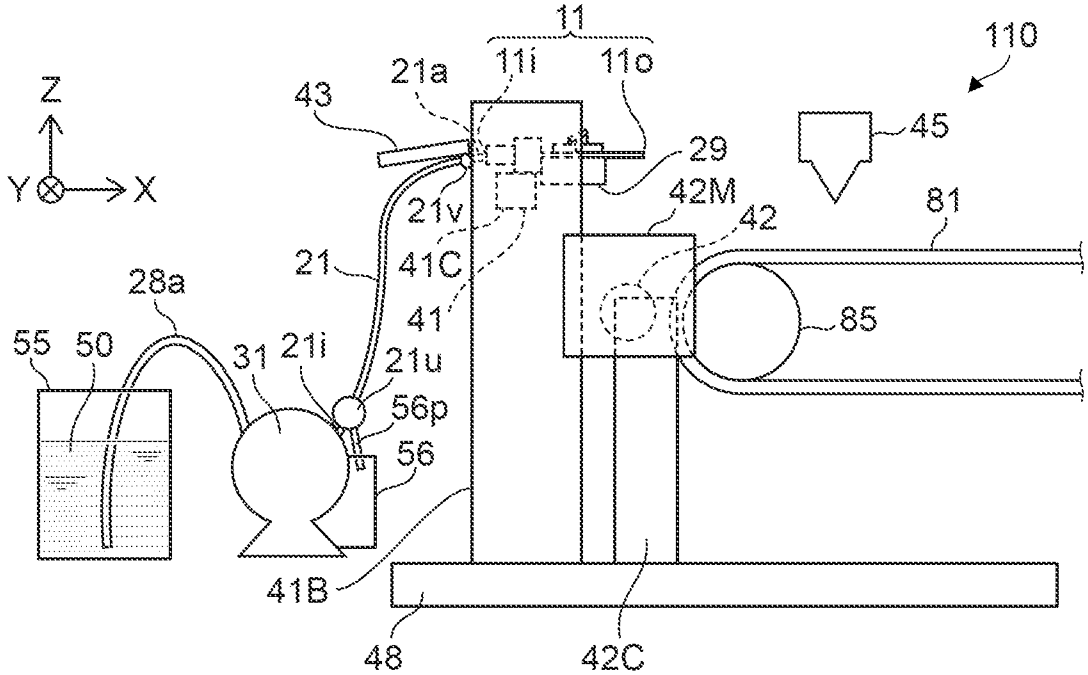
FIG. 1 is a schematic side view illustrating a coating apparatus according to a first embodiment.

According to one embodiment of the invention, a coating apparatus includes a first pipe, a first pump, a first nozzle, a second nozzle, and a holder. The first pipe includes a first inflow port, a first outflow port, and a second outflow port. The first pump is configured to supply liquid toward the first inflow port. The first nozzle includes a first nozzle inflow port and a first nozzle discharge port. The first nozzle inflow port is connected to the first outflow port. The first nozzle discharge port is configured to discharge the liquid passing through the first pipe. The second nozzle includes a second nozzle inflow port and a second discharge port. The second nozzle inflow port is connected to the second outflow port. The second nozzle discharge port is configured to discharge the liquid passing through the first pipe. The holder holds the first nozzle and the second nozzle. The holder is configured to form a first state and a second state. In the first state, a height of the first nozzle discharge port and a height of the second nozzle discharge port are not less than a height of the first pipe. In the second state, the height of the first nozzle discharge port and the height of the second nozzle discharge port are lower than the height of the first pipe.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic side view illustrating a coating apparatus according to a first embodiment.

Figure 2:
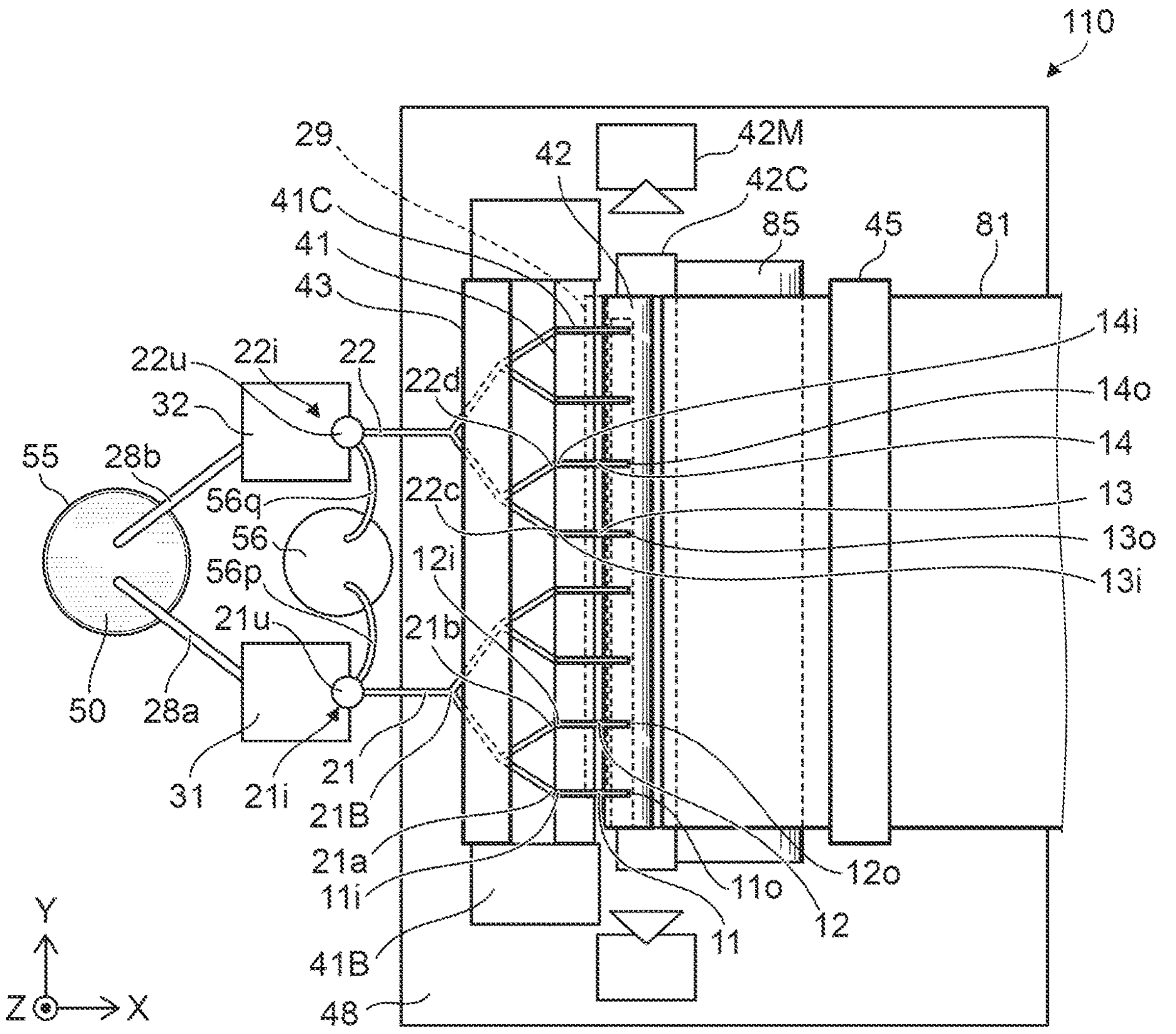
FIG. 2 is a schematic top view illustrating the coating apparatus according to the first embodiment.

FIG. 2 is a schematic top view illustrating the coating apparatus according to the first embodiment.

FIG. 3A, FIG. 3B, FIG. 4A, FIG. 4B, FIG. 5A and FIG. 5B are schematic side views illustrating the coating apparatus according to the first embodiment.

As shown in FIG. 1 and FIG. 2, a coating apparatus 110 according to the embodiment includes a first pipe 21, a first pump 31, a first nozzle 11, a second nozzle 12 and a holder 41.

The first pipe 21 includes a first inflow port 21*i*, a first outflow port 21*a*, and a second outflow port 21*b*. The first pump 31 is configured to supply a liquid 50 toward the first inflow port 21*i*.

In this example, the liquid 50 is stored in the container 55. The liquid 50 flows into the first pump 31 via the pipe 28*a*.

The first nozzle 11 includes a first nozzle inflow port 11*i* and a first nozzle discharge port 11*o*. The first nozzle inflow port 11*i* is connected to the first outlet 21*a*. The first nozzle discharge port 11*o* is configured to discharge the liquid 50 that has passed through the first pipe 21. When the first pump 31 supplies the liquid 50 to the first pipe 21, the liquid 50 is discharged from the first nozzle discharge port 11*o*.

The second nozzle 12 includes a second nozzle inflow port 12*i* and a second nozzle outflow port 12*o*. The second nozzle inflow port 12*i* is connected to the second outflow port 21*b*. The second nozzle discharge port 12*o* is configured to discharge the liquid 50 that has passed through the first pipe 21. When the first pump 31 supplies the liquid 50 to the first pipe 21, the liquid 50 is discharged from the second nozzle discharge port 12*o*.

The holder 41 holds the first nozzle 11 and the second nozzle 12. For example, the holder 41 has a bar shape. The first nozzle 11 and the second nozzle 12 may be fixed to the holder 41 by any method.

As shown in FIG. 1 and FIG. 2, for example, a base 48 is provided. The surface of the base 48 extends, for example, along the X-Y plane. A direction perpendicular to the X-Y plane is a Z-axis direction.

The holder base 41B is provided on the base 48. The holder base 41B may be movable with respect to the base 48. The holder base 41B holds the bar-shaped holder 41. The bar-shaped holder 41 extends, for example, along a Y-axis direction.

In this example, the holder 41 is rotatable with respect to the holder base 41B. The rotation is, for example, centered in the Y-axis direction. For example, an angle of the holder 41 can be changed with reference to the holder base 41B. The angle may be changeable while the angle is limited. When the angle changes, angles of the multiple nozzles held by the holder 41 also change. In the embodiment, the angles of the multiple nozzles may change without changing the angle of the holder 41.

Figure 3A:
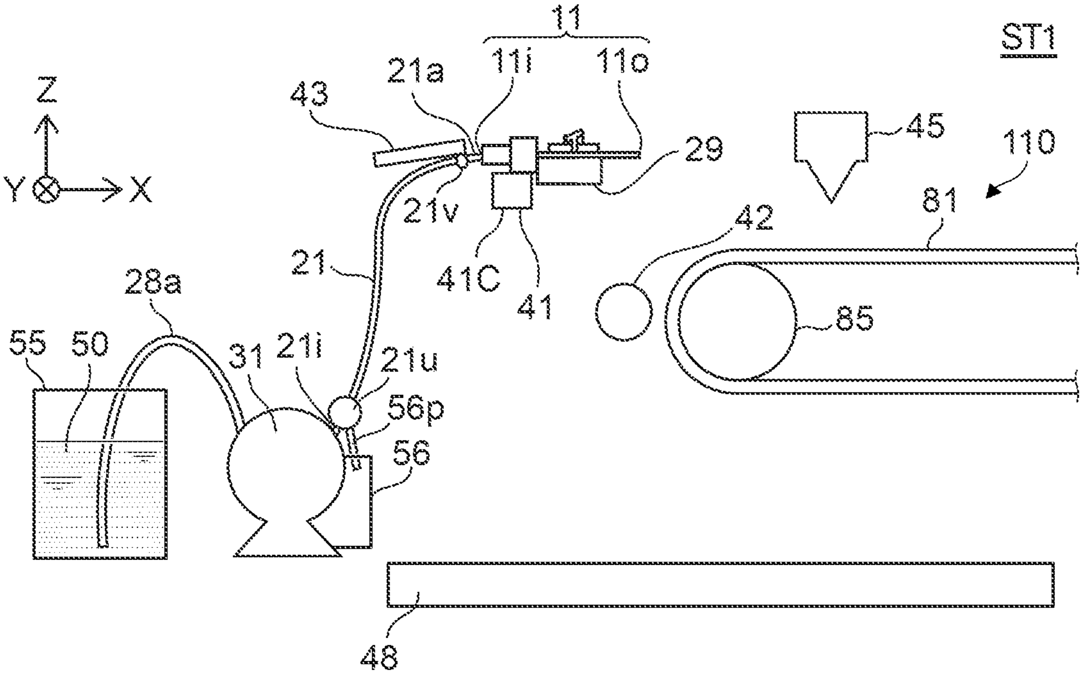
FIG. 3A and FIG. 3B are schematic side views illustrating the coating apparatus according to the first embodiment.
Figure 3B:
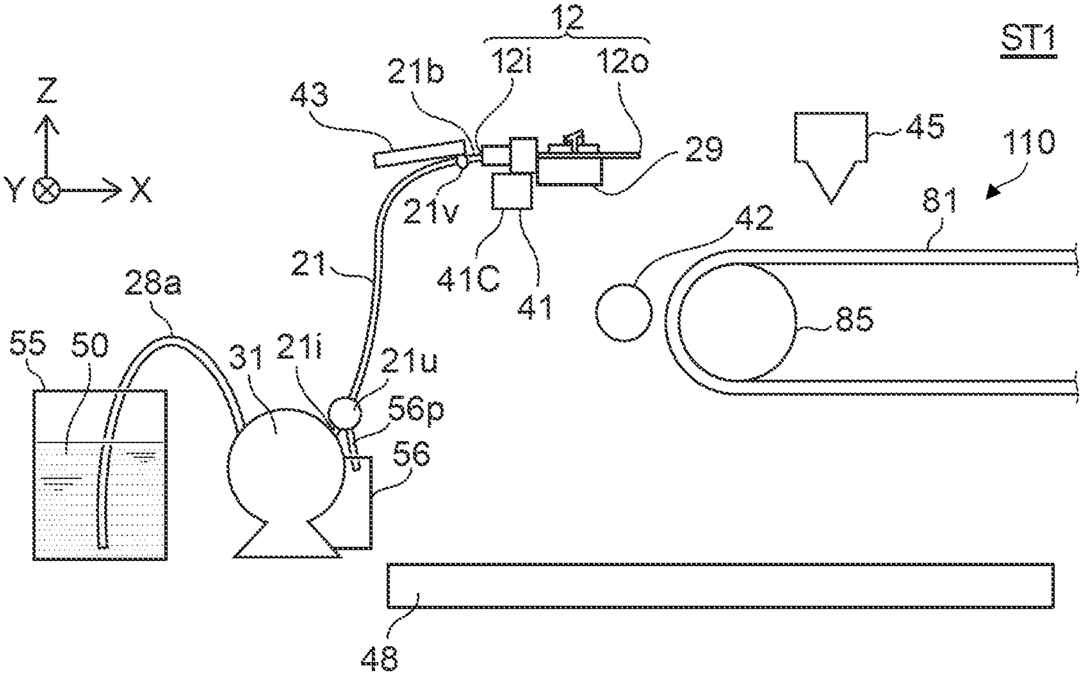
Figure 4A:
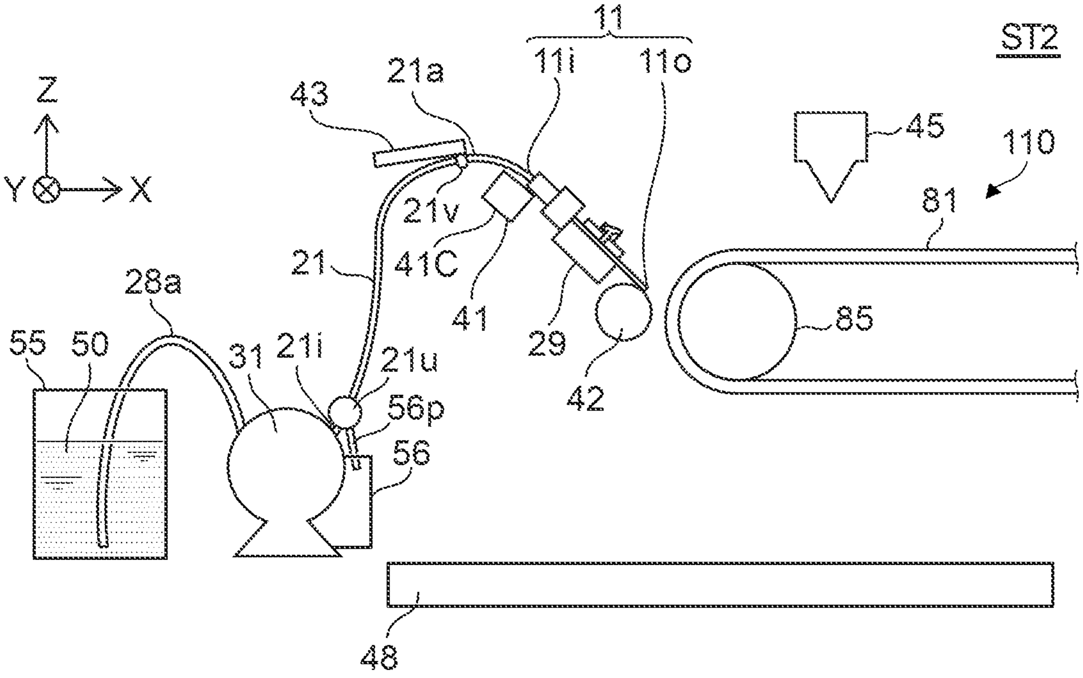
FIG. 4A and FIG. 4B are schematic side views illustrating the coating apparatus according to the first embodiment.
Figure 4B:
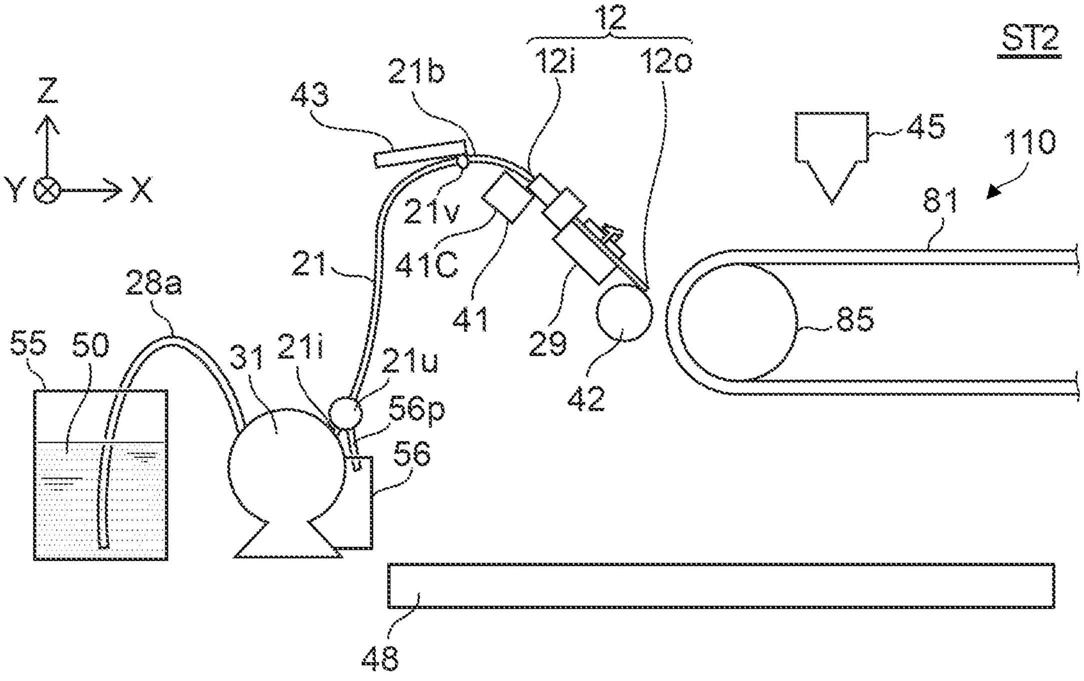

The holder 41 has multiple states. The holder 41 is configured to form multiple states (for example, a first state and a second state). FIG. 3A) and FIG. 3B illustrate the first state ST1. FIG. 4A and FIG. 4B illustrate the second state ST2. FIGS. 3A and FIG. 4A illustrate a portion including the first nozzle 11. FIG. 3B and FIG. 4B illustrate a portion including the second nozzle 12. In these figures, some elements included in the coating apparatus 110 are omitted for the sake of clarity.

As shown in FIG. 3A and FIG. 3B, in the first state ST1, a height of the first nozzle discharge port 11*o* and a height of the second nozzle discharge port 12*o* are not less than a height of the first pipe 21. As shown in FIG. 4A and FIG. 4B, in the second state ST2, the height of the first nozzle discharge port 11*o* and the height of the second nozzle discharge port 12*o* are lower than the height of the first pipe 21. The height is, for example, a position in the Z-axis direction. The height is, for example, a position in the Z-axis direction with respect to the base 48. With such a first state ST1, a uniform coating film can be formed as described below.

For example, the liquid 50 may be supplied to the first pipe 21 in a state where a gas such as air remains inside a part of the first pipe 21. For example, gas such as air may remain in at least one of the first nozzle 11 or the second nozzle 12. When the liquid 50 is supplied to the first pipe 21 in such a state, the state in which the gas is not discharged and the liquid is easily discharged from the nozzle in which no gas remains is likely to continue. If the gas is not discharged, it becomes difficult to uniformly discharge the liquid 50. If the liquid 50 is not uniformly discharged, the liquid 50 tends to be unevenly coated to a coating member 81.

In the embodiment, the above-mentioned first state ST1 and second state ST2 can be formed. For example, the first pump 31 is configured to supply the liquid 50 to the first inflow port 21*i* in the first state ST1 and to discharge the liquid 50 from the first nozzle discharge port 11*o* and the second nozzle discharge port 12*o*. At this time, in the first state ST1, the height of the first nozzle discharge port 11*o* and the height of the second nozzle discharge port 12*o* are not less than the height of the first pipe 21. When the liquid 50 is supplied to the first nozzle 11 and the second nozzle 12 via the first pipe 21 in such a first state ST1, even if the gas exists in the first pipe 21, the first nozzle 12, and the second nozzle 12, the gas can also be discharged from these nozzles. This enables uniform discharge.

In the second state ST2, the liquid 50 is discharged from the first nozzle 11 and the second nozzle 12, and the liquid 50 is coated to the coating member 81. The coated liquid 50 is uniform.

As described above, the first pump 31 is configured to supply the liquid 50 to the first inflow port 21*i* in the first state ST1 to discharge the gas in at least one of the first nozzle 11 or the second nozzle 12 from at least one of the first nozzle 11 or the second nozzle 12. According to the embodiment, a uniform coated film can be formed.

The first pump 31 is configured to supply the liquid 50 to the first inflow port 21*i* in the second state ST2 and discharge the liquid 50 from the first nozzle 11 and the second nozzle 12, and is configured to coat the liquid 50 to the coating member 81. The coated film obtained from the coated liquid 50 is uniform. As described above, the first nozzle discharge port 11*o* and the second nozzle discharge port 12*o* is configured to coat the liquid 50 to the coating member 81.

For example, when coating is performed in the second state ST2 without going through the first state ST1 described above, gas tends to remain in at least one of the multiple nozzles. The liquid 50 is discharged from another nozzle while the gas remains. Therefore, the gas continues to remain. If the coating is performed with the gas remaining, the coating tends to be uneven.

As shown in FIG. 3A and FIG. 3B, the coating apparatus 110 may further include a nozzle liquid receiving part 29. The nozzle liquid receiving part 29 is configured to receive the liquid 50 discharged from the first nozzle discharge port 11*o* and the second nozzle discharge port 12*o*, for example, in the first state ST1. In the first state ST1 for removing gas, the heights of the first nozzle discharge port 11*o* and the second nozzle discharge port 12*o* are high. When the liquid 50 is discharged from the first nozzle discharge port 11*o* and the second nozzle discharge port 12*o* in such a first state ST1, the liquid 50 moves toward the first pipe 21 via these nozzles. The first pipe 21 and the like get dirty with the liquid 50. Dirt can be suppressed by taking in the liquid 50 by the nozzle liquid receiving part 29. In the embodiment, the nozzle liquid receiving part may be provided below the nozzle discharge port.

Figure 5A:
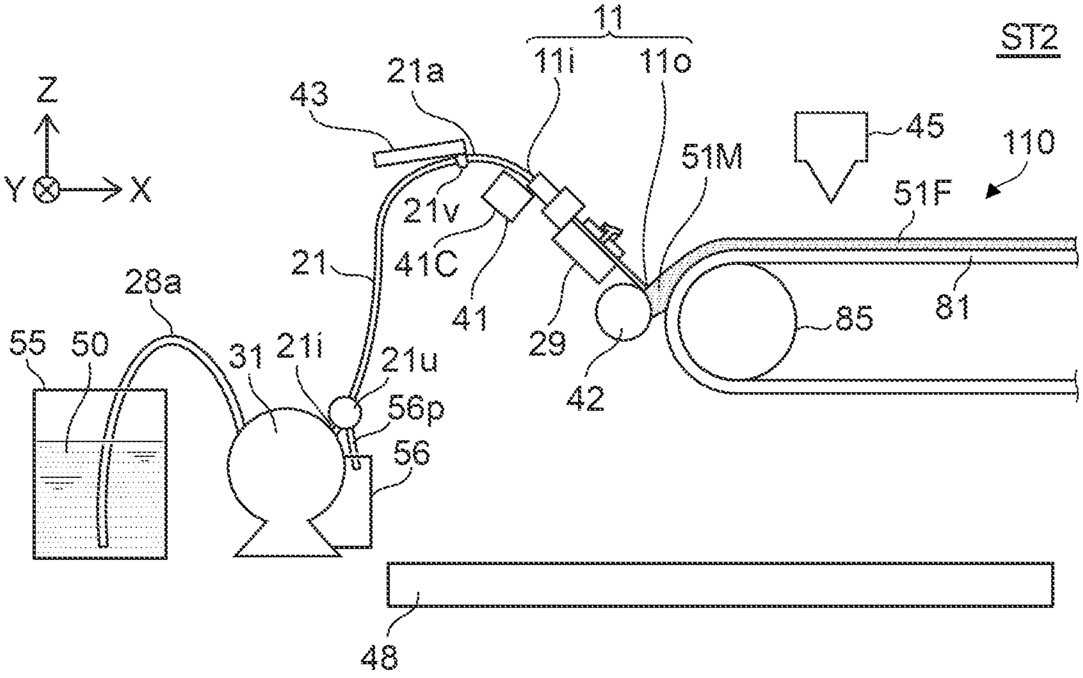
FIG. 5A and FIG. 5B are schematic side views illustrating the coating apparatus according to the first embodiment.
Figure 5B:
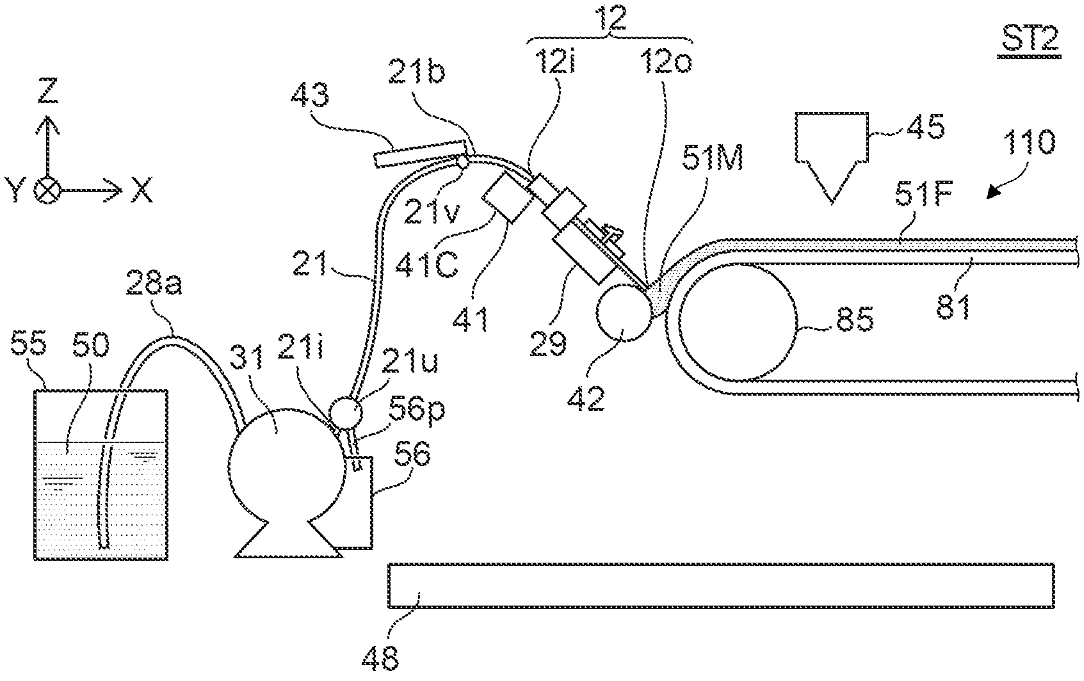

FIG. 5A and FIG. 5B illustrate a state in which the liquid 50 is discharged from the nozzle in the second state ST2. These figures correspond to the operation of coating the liquid 50 to the coating member 81.

As shown in FIG. 1, FIG. 2, FIG. 5A and FIG. 5B, the coating apparatus 110 includes a coating bar 42. The coating bar 42 is configured to face the coating member 81. The coating bar 42 extends, for example, along the Y-axis direction. As shown in FIG. 5A and FIG. 5B, in the second state ST2, the first nozzle discharge port 11*o* and the second nozzle discharge port 12*o* are configured to supply the liquid 50 toward the coating bar 42. When the first pump 31 supplies the liquid 50 to the first pipe 21, the liquid 50 is supplied from these nozzles toward the coating bar 42.

As shown in FIG. 5A and FIG. 5B, for example, the coating bar 42 is configured to form a meniscus 51M of the liquid 50 between the coating bar 42 and the coating member 81. By forming the meniscus 51M, a more uniform coated film 51F can be easily obtained.

In the second state ST2, the first nozzle discharge port 11*o* and the second nozzle discharge port 12*o* may be in contact with the coating bar 42. More stable coating is performed.

As shown in FIG. 1 and FIG. 2, in this example, the coating apparatus 110 further includes a coating member holder 85 and a coating bar position controller 42C. The coating member holder 85 holds the coating member 81. In this example, the coating member holder 85 is configured to transport the coating member 81. In this example, the coating member 81 is in the form of a film. The coating member holder 85 includes a roller which is configured to transport the film-shaped coating member 81.

The coating bar position controller 42C is configured to control the relative position between the coating bar 42 and the coating member holder 85. The coating bar position controller 42C is configured to control the relative position between the coating bar 42 and the coating member 81. The coating bar position controller 42C is configured to control the relative position between the coating bar 42 and the coating member holder 85 in at least one of the X-axis direction, the Y-axis direction, or the Z-axis direction, for example. As the coating bar position controller 42C, for example, an actuator that can move in multiple directions may be used.

As shown in FIG. 1 and FIG. 2, the coating apparatus 110 may further include a detector 42M. The detector 42M is configured to detect, for example, the relative position between the coating bar 42 and the coating member holder 85. The detector 42M may include, for example, an optical sensor or the like. Based on the detection result by the detector 42M, the coating bar position controller 42C may control the relative position between the coating bar 42 and the coating member holder 85.

The holder 41 may be configured to control the relative positional relationship between the first nozzle 11 and the coating bar 42 and the relative positional relationship between the second nozzle 12 and the coating bar 42. The relative positional relationship may be, for example, a positional relationship in at least one of the X-axis direction, the Y-axis direction, or the Z-axis direction.

As shown in FIG. 1 and FIG. 2, in this example, the holder 41 includes a nozzle spacing controller 41C. For example, the nozzle spacing controller 41C is configured to control spacing between the first nozzle 11 and the second nozzle 12. The spacing is, for example, a distance along the Y-axis direction. In one example, a recess is provided in a part of the bar-shaped holder 41, and the recess serves as a nozzle spacing controller 41C. By providing multiple recesses and fixing the nozzles at desired positions of the multiple recesses, the spacing between the multiple nozzles can be variably controlled. The structure for holding the multiple nozzles and the method for controlling the spacing between the multiple nozzles are arbitrary. The spacing between the multiple nozzles may be changed according to the characteristics of the liquid 50 (for example, viscosity). The recess can be formed, for example, by a groove or a spacer.

In the embodiment, the first nozzle 11 is needle-shaped. By using the needle-shaped first nozzle 11, for example, the discharge amount of the liquid 50 can be controlled with high accuracy. When the nozzles are needle-shaped, for example, the tips of multiple nozzles are likely to come into contact with the coating bar 42. High flexibility is obtained in the needle-shaped nozzle. Due to the high flexibility, it is possible to prevent the nozzle from being damaged by, for example, vibration of the coating bar 42. In the needle-shaped nozzle, a length of the nozzle is, for example, not less than 10 mm and not more than 100 mm, and an inner diameter of the nozzle is, for example, not less than 1 mm and not more than 2 mm. An angle between the end face of the tip of the nozzle and the extending direction of the nozzle is, for example, about 90 degrees (for example, not less than 75 degrees and not more than 105 degrees). With such a shape, for example, it is possible to suppress the coating bar 42 from being scratched. With such a shape, for example, the supply of the liquid 50 to the coating bar 42 can be easily stabilized.

As shown in FIG. 2, the first pipe 21 may include out flow ports of not less than 4. Nozzles are connected to each of the out flow ports of not less than 4. For example, the first pipe 21 includes multiple branch portions 21B that branch into two each. For example, the first pipe 21 includes an out flow ports of 2 to the nth power (n is an integer of not less than 1). Uniform discharge of the liquid 50 becomes easier.

In the embodiment, the first pipe 21 may include a check valve 21*v*. The check valve 21*v* can suppress the backflow of gas. For example, the inflow of gas (air) can be suppressed.

In the embodiment, the first pump 31 may include a diaphragm pump. The diaphragm pump facilitates stable and uniform supply of the liquid 50. For example, various solvents are applicable. For example, "priming water" is unnecessary. For example, high durability can be obtained. For example, it can be operated idle and can be used for drying.

As shown in FIG. 1 and FIG. 2, the coating apparatus 110 may include a pipe height controller 43. The pipe height controller 43 controls the height of the first pipe 21. For example, in the first state ST1, the second state ST2, and the state between them, the first pipe 21 may move according to the change in the height of the first nozzle 11 and the second nozzle 12. The first pipe 21 may move and the first pipe 21 may not have a desired height. By providing the pipe height controller 43, the height of the first pipe 21 is controlled to a desired state. For example, in the first state ST1, the maximum height in the first pipe 21 is limited to be not more than the desired height. In this example, the pipe height controller 43 has a bar shape (or a plate shape) extending in the Y-axis direction.

As shown in FIG. 1 and FIG. 2, the coating apparatus 110 may further include a drying part 45. The drying part 45 is configured to dry the liquid 50 coated to the coating member 81. The drying part 45 may include, for example, an air nozzle.

As shown in FIG. 1 and FIG. 2, the first pipe 21 may include a discharge valve 21*u*. By the operation of the discharge valve 21*u*, the liquid 50 in the first pipe 21 can be discharged to a container 56 via, for example, a discharge pipe 56*p*.

As shown in FIG. 2, in this example, the coating apparatus 110 further includes a second pipe 22, a second pump 32, a third nozzle 13 and a fourth nozzle 14. The second pipe 22 includes a second inflow port 22*i*, a third outflow port 22*c*, and a fourth outflow port 22*d*.

The second pump 32 is configured to supply the liquid 50 toward the second inflow port 22*i*. For example, the liquid 50 in the container 55 is supplied to the second pump 32 via a pipe 28*b*.

The third nozzle 13 includes a third nozzle inflow port 13*i* and a third nozzle discharge port 13*o*. The third nozzle inflow port 13*i* is connected to the third outflow port 22*c*. The third nozzle discharge port 13*o* is configured to discharge the liquid 50 that has passed through the second pipe 22.

The fourth nozzle 14 includes a fourth nozzle inflow port 14*i* and a fourth nozzle discharge port 14*o*. The fourth nozzle inflow port 14*i* is connected to the fourth outflow port 22*d*. The fourth nozzle discharge port 14*o* is configured to discharge the liquid 50 that has passed through the second pipe 22.

The holder 41 further holds the third nozzle 13 and the fourth nozzle 14.

FIG. 6A, FIG. 6B, FIG. 7A, FIG. 7B, FIG. 8A and FIG. 8B are schematic side views illustrating the coating apparatus according to the first embodiment.

Figure 6A:
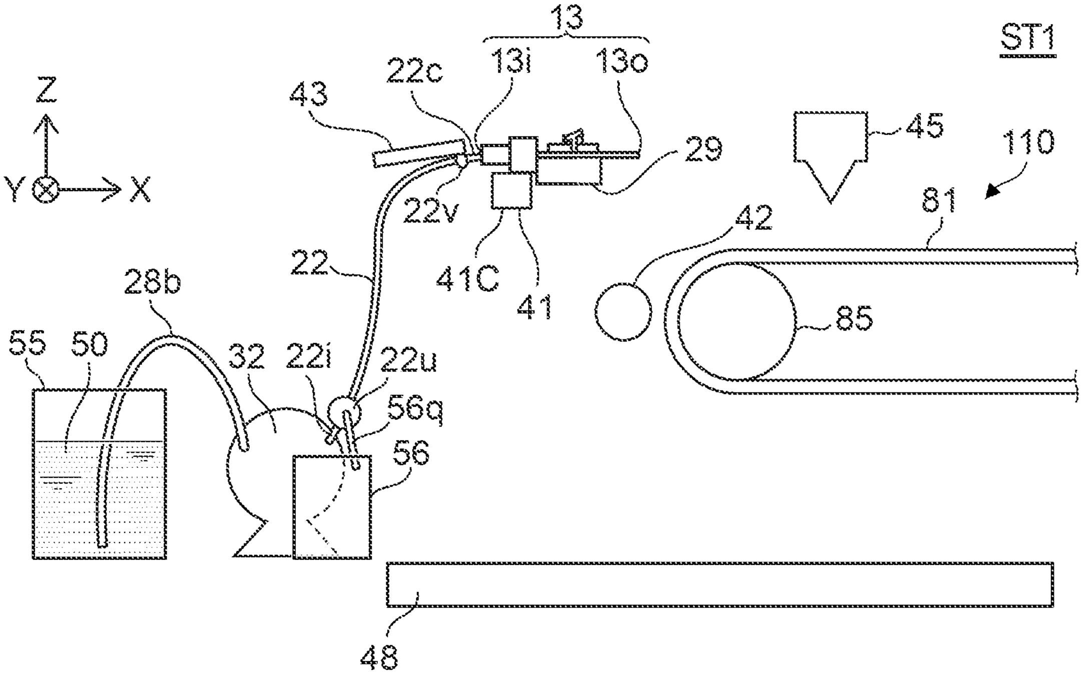
FIG. 6A and FIG. 6B are schematic side views illustrating the coating apparatus according to the first embodiment.
Figure 6B:
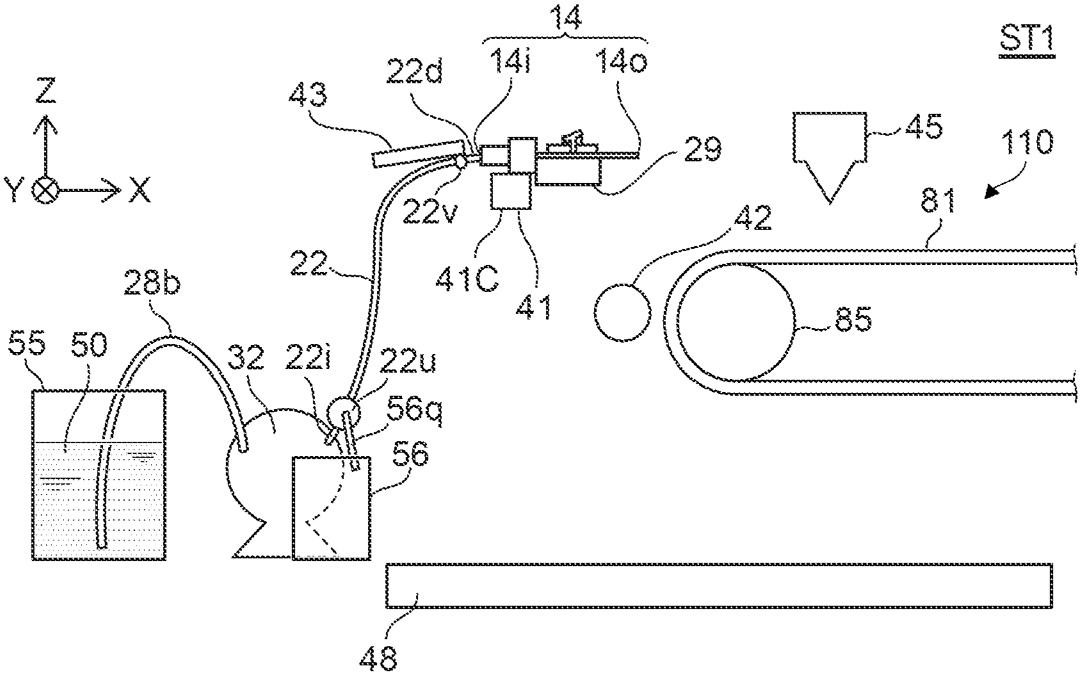
Figure 7A:
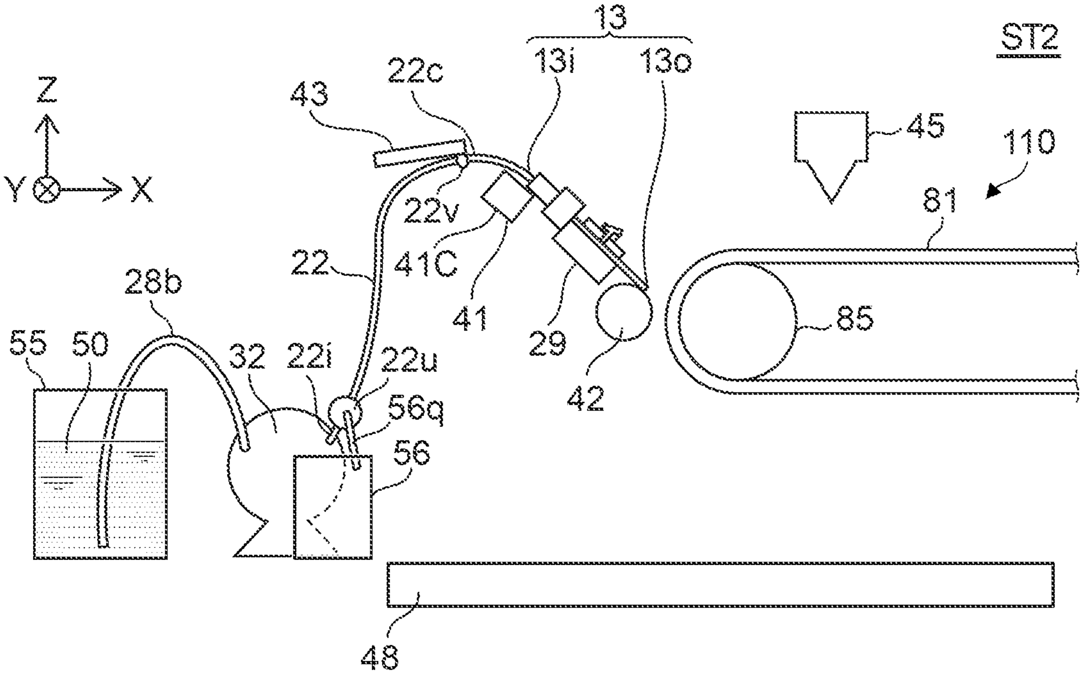
FIG. 7A and FIG. 7B are schematic side views illustrating the coating apparatus according to the first embodiment.
Figure 7B:
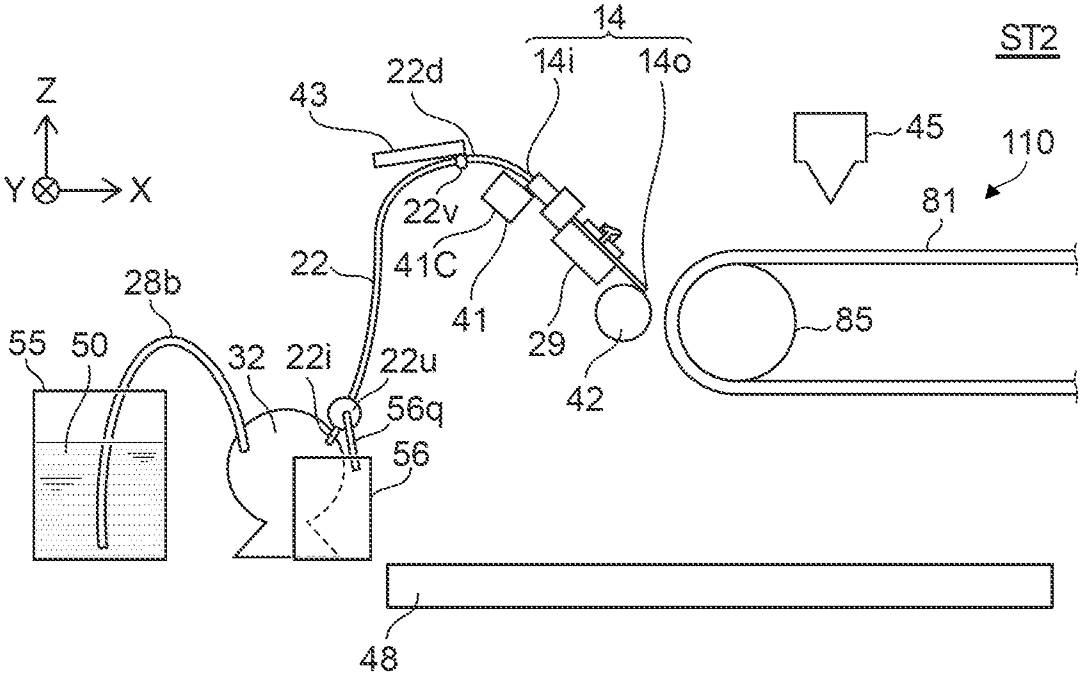
Figure 8A:
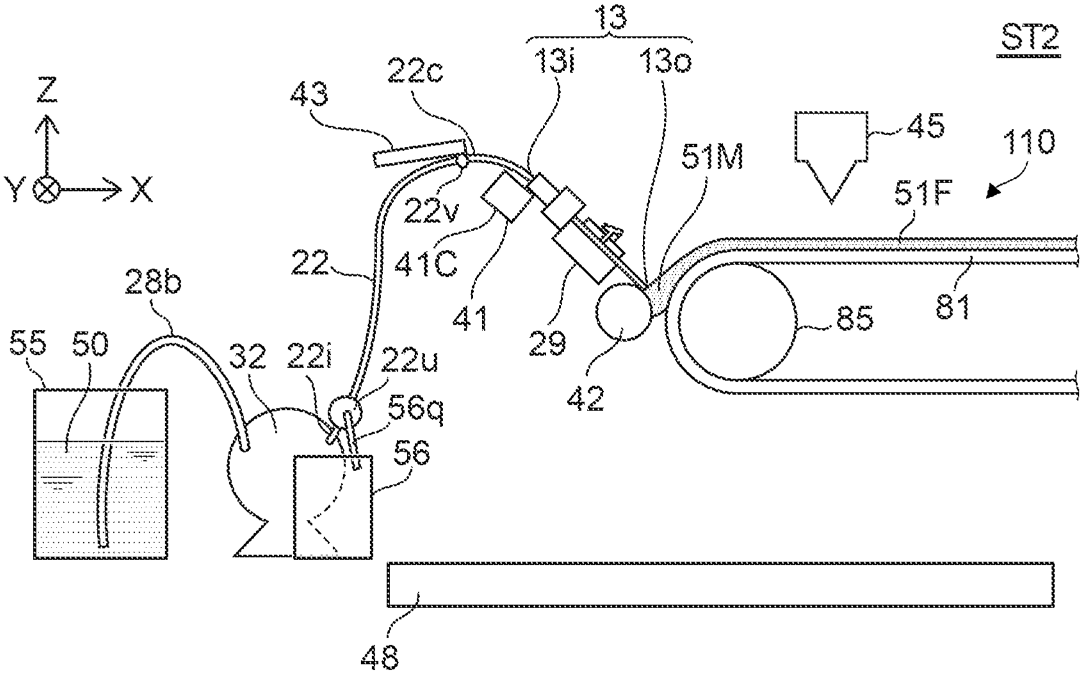
FIG. 8A and FIG. 8B are schematic side views illustrating the coating apparatus according to the first embodiment.
Figure 8B:
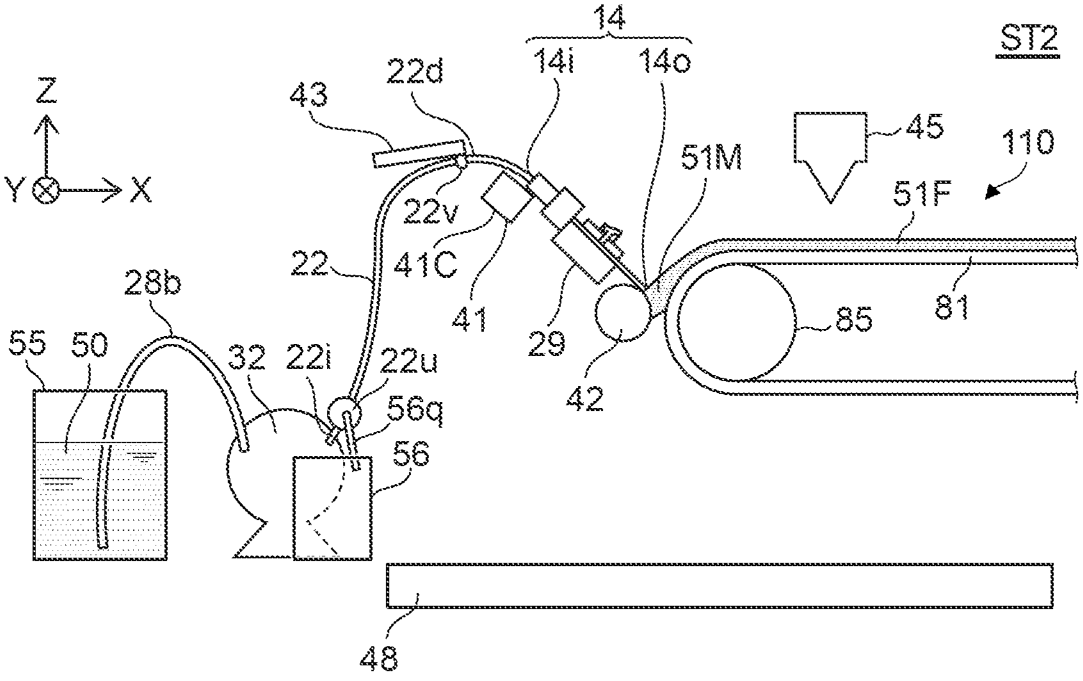

FIG. 6A illustrates the third nozzle 13 in the first state ST1. FIG. 6B illustrates the fourth nozzle 14 in the first state ST1. FIG. 7A illustrates the third nozzle 13 in the second state ST1. FIG. 7B illustrates the fourth nozzle 14 in the second state ST2. FIG. 8A illustrates the coating by the third nozzle 13 of the second state ST2. FIG. 8B illustrates the coating by the fourth nozzle 14 of the second state ST2.

As shown in FIG. 6A and FIG. 6B, in the first state ST1, a height of the third nozzle discharge port 13*o* and a height of the fourth nozzle discharge port 14*o* are not less than the heights of the second pipe 22.

As shown in FIG. 7A and FIG. 7B, in the second state ST2, the height of the third nozzle discharge port 13*o* and the height of the fourth nozzle discharge port 14*o* are lower than the height of the second pipe 22.

In such a first state ST1, gas can be discharged from the third nozzle 13 and the fourth nozzle 14. As shown in FIG. 8A and FIG. 8B, in the second state ST2, the liquid 50 is discharged from the third nozzle 13 and the fourth nozzle 14, and the liquid 50 can be coated to the coating member 81. The coated film 51F made of the liquid 50 can be formed on the coating member 81.

As shown in FIG. 6A and FIG. 6B, in the embodiment, the second pipe 22 may include a check valve 22*v*. The check valve 22*v* can suppress the backflow of gas. For example, the inflow of gas (air) can be suppressed.

As shown in FIG. 2, FIG. 6A and FIG. 6B, the second pipe 22 may include a discharge valve 22*u*. By the operation of the discharge valve 22*u*, the liquid 50 in the second pipe 22 can be discharged to the container 56 via, for example, a discharge pipe 56*q*.

In the embodiment, the cross-sectional shape of the coating bar 42 is arbitrary. The cross-sectional shape of the coating bar 42 is, for example, circular, flat circular or polygonal. A part of the cross-sectional shape may be curved, and the other part may be straight. For example, the cross-sectional shape of the surface of the coating bar 42 facing the coating member 81 may be curved.

The coating bar 42 includes, for example, at least one selected from the group consisting of stainless steel, aluminum, titanium and glass. The coating bar 42 more preferably includes stainless steel or aluminum. This facilitates the processing of the coating bar 42. In one example, the surface of the coating bar 42 is a mirror surface. In another example, the surface of the coating bar 42 may include irregularities.

Figure 9:
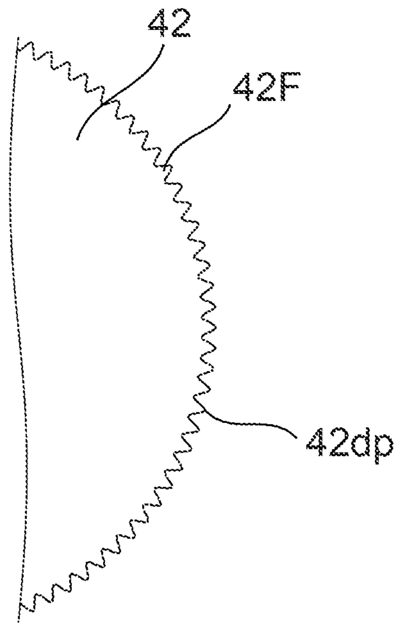
FIG. 9 is a schematic side view illustrating a part of the coating apparatus according to the first embodiment.

FIG. 9 is a schematic side view illustrating a part of the coating apparatus according to the first embodiment.

FIG. 9 illustrates a part of the coating bar 42. As shown in FIG. 9, in the embodiment, a surface 42F of the coating bar 42 may include an unevenness 42*dp*. The maximum height Rz of the unevenness 42*dp* is, for example, not less than 5 μm and not more than 50 μm. The arithmetic average surface roughness Ra of the unevenness 42*dp* is, for example, not less than 1 μm and not more than 10 μm. For example, the unevenness 42*dp* may be produced by the sandblasting method. By providing the unevenness 42*dp*, for example, high wettability to the liquid 50 can be obtained.

Second Embodiment

The second embodiment relates to a coating method. In the coating method according to the embodiment, for example, coating is performed using the coating apparatus 110 (and a modification thereof) described with respect to the first embodiment.

Figure 10:
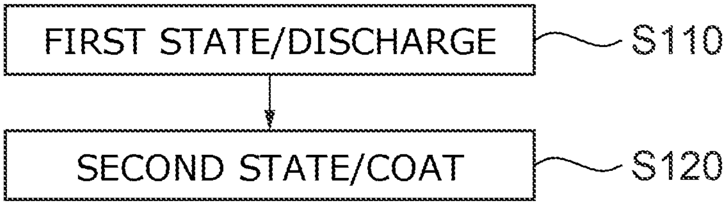
FIG. 10 is a flow chart illustrating a coating method according to a second embodiment.

FIG. 10 is a flow chart illustrating the coating method according to the second embodiment.

As shown in FIG. 10, in the first state ST1, the liquid 50 is supplied to the first inflow port 21*i*, and the gas in at least one of the above-mentioned first nozzle 11 or the second nozzle 12 is discharged from at least one of the first nozzle 11 or the second nozzle 12 (step S110).

After the gas is discharged, the liquid 50 is supplied to the first inflow port 21*i* in the second state ST2, the liquid 50 is discharged from the first nozzle 11 and the second nozzle 12, and the liquid 50 is coated to the coating member 81 (step S120).

In the coating method according to the embodiment, in the first state ST1 before coating, the height of the first nozzle discharge port 11*o* and the height of the second nozzle discharge port 12*o* are not less than the height of the first pipe 21. By supplying the liquid 50 in this first state ST1, the gas can be efficiently discharged. According to the embodiment, it is possible to provide a coating method capable of forming a uniform coated film.

Hereinafter, an example of the coating apparatus and the coating method according to the embodiment will be described.

For example, a solar cell can be formed by coating with the coating apparatus 110. In one example, the number of pumps is four. The pipe connected to one pump is connected to four nozzles. The total number of nozzles is 16.

For example, the coating member 81 is a roll-shaped PET film. A width of the PET film is, for example, 330 mm. A light-transmitting electrode with a width of 300 mm is formed on the PET film by a roll-to-roll sputter apparatus. The sheet resistance of the electrode is, for example, 5Ω/□. The electrode has, for example, an ITO film/Ag alloy/ITO film stacked structure. For example, multiple electrodes are provided. A length of one of the multiple electrodes is, for example, about 20 mm. A distance between the multiple electrodes is, for example, 50 μm.

The cross section of the coating bar 42 is circular. A radius of the circle is 10 mm. A length of the coating bar 42 is 300 mm. The coating bar 42 includes, for example, stainless steel (e.g., SUS303).

For example, a length of the holder 41 is 320 mm. The holder 41 is provided with multiple holes. A pitch of the multiple holes is 18 mm. Nozzles are fixed in each of the multiple holes.

The nozzle includes a stainless steel locking group. A length of the nozzle is 50 mm. The pipe (first pipe 21, etc.) is a pipe made of polytetrafluoroethylene. The nozzle and the pipe are connected by a detachable joint. The pipe is connected to the pump.

In one example, the liquid 50 forms a hole transport layer. In this case, the liquid 50 is an aqueous solution including PEDOT and PSS.

For example, the actuator controls the relative positional relationship between the coating bar 42 and the coating member 81.

For example, the nozzle is made horizontal. At this time, a height of the tip of the nozzle is not less than a height of the pipe (first pipe 21). The height of the pipe is appropriately controlled by the pipe height controller 43. In such a first state ST1, the liquid 50 is supplied and the air in the nozzle is discharged.

After that, the tip of the nozzle is tilted downward by about 50°. At this time, the pipe height controller 43 may be removed if necessary. With the tip of the nozzle tilted downward, the tip of the nozzle is brought into contact with the coating bar 42. In this second state ST2, the liquid 50 is not substantially discharged from the nozzle before the pump supplies the liquid 50.

For example, the liquid 50 is continuously supplied by a pump while transporting the coating member 81, and the coated film 51F is obtained. The moving speed of the coating member 81 is, for example, 5 m/min. The drying part 45 blows heated dry air onto the coated liquid 50. The coated film 51F is obtained from the liquid 50.

After the coating is completed, for example, the tip of the nozzle may be higher than the pipe (first pipe 21 or the like). The liquid 50 in the pipe may be collected by opening the drain valve (discharge valve 21*u* or the like).

In the embodiment, after coating the above liquid 50, another liquid may be further coated. The other liquid 50 includes, for example, a semiconductor material. The other liquid 50 includes, for example, PTB7 ([poly {4,8-bis[(2-ethylhexyl) oxy]benzo[1,2-b:4,5-b'] dithiophene-2,6-diyl-1t-alt-3-fluoro-2-[(2-ethylhexyl) carbonyl]thieno [3,4-b] thiophene-4,6-diyl}]) and PC70BM ([6,6]phenyl C71 methylester butylate)). PTB7 is, for example, a p-type semiconductor. The PC70BM is, for example, an n-type semiconductor. The other liquid 50 further includes, for example, monochlorobenzene. For 1 mL of monochlorobenzene, the amount of PTB7 is 8 mg. For 1 mL of monochlorobenzene, the amount of PC70BM is 12 mg. The other liquid 50 is a dispersion liquid including an organic semiconductor.

The other liquid 50 is, for example, a semiconductor film of a solar cell. In the coating of the other liquid 50, the minimum gap distance between the coating bar 42 and the coating member 81 is 300 μm. The moving speed of the coating member 81 is, for example, 5 m/min. After the coating, drying is performed by the drying part 45.

For example, there are organic thin-film solar cells using organic semiconductors or organic/inorganic hybrid solar cells. By manufacturing these solar cells by the coating method, the cost can be reduced. If a pump is provided for each of the multiple nozzles, the size of the apparatus becomes large and the cost of the apparatus increases. By supplying the liquid to the multiple nozzles by one pump, the apparatus can be miniaturized and the cost of the apparatus can be suppressed. It has been found that when the liquid is supplied to the multiple nozzles by one pump, it is difficult to remove the gas if the gas remains in the multiple nozzles. In the embodiment, the gas can be easily removed by forming the first state ST1 having the height not less than the pipe height at the tip of the nozzle.

In the embodiment, it is preferable that the first pipe 21 is branched into two. It is easier to supply the liquid 50 more uniformly than when three or more branches are separated. For example, in the embodiment, for example, the nozzle may be contacted from above the coating bar 42. The liquid 50 does not easily fall under the apparatus.

In the embodiment, the liquid 50 may be coated to the coating member 81 at a position where the coating member 81 is transported in the vertical direction. As a result, for example, the effect of gravity is added to the meniscus 51M, and it becomes easy to obtain a uniform film even at high speed.

In the embodiment, the liquid 50 may be coated to the coating member 81 at a position where the coating member 81 is transported in the horizontal direction. Thereby, for example, dripping can be suppressed. For example, it becomes easy to control the positional relationship between the nozzle after air vent and the coating bar 42. In this case, the liquid may be supplied to the coating bar 42 from the upstream side in the transport direction or from the downstream side, but in the case of high-speed transport, a uniform film can be easily obtained on the upstream side.

In the embodiment, a step of closing the tip of the nozzle may be provided after the coating is completed. This suppresses the drying of the coated liquid. For example, nozzle blockage is suppressed.

The embodiment may include the following configurations (for example, technical proposals).

Configuration 1

A coating apparatus, comprising:

a first pipe including a first inflow port, a first outflow port, and a second outflow port;

a first pump configured to supply liquid toward the first inflow port;

a first nozzle including a first nozzle inflow port and a first nozzle discharge port, the first nozzle inflow port being connected to the first outflow port, the first nozzle discharge port being configured to discharge the liquid passing through the first pipe;

a second nozzle including a second nozzle inflow port and a second discharge port, the second nozzle inflow port being connected to the second outflow port, the second nozzle discharge port being configured to discharge the liquid passing through the first pipe; and a holder holding the first nozzle and the second nozzle, the holder being configured to form a first state and a second state, in the first state, a height of the first nozzle discharge port and a height of the second nozzle discharge port being not less than a height of the first pipe, in the second state, the height of the first nozzle discharge port and the height of the second nozzle discharge port being lower than the height of the first pipe.

Configuration 2

The coating apparatus according to Configuration 1, wherein the first pump is configured to supply the liquid to the first inflow port in the first state to discharge the liquid from the first nozzle discharge port and the second nozzle discharge port.

Configuration 3

The coating apparatus according to Configuration 2, further comprising:

a nozzle liquid receiving part, the nozzle liquid receiving part being configured to receive the liquid discharged from the first nozzle discharge port and the second nozzle discharge port.

Configuration 4

The coating apparatus according to one of Configurations 1 to 3, wherein the first pump is configured to supply the liquid to the first inflow port in the first state to discharge the gas in at least one of the first nozzle or the second nozzle from at least one of the first nozzle or the second nozzle.

Configuration 5

The coating apparatus according to one of Configurations 1 to 4, wherein the first pump is configured to supply the liquid to the first inflow port in the second state and discharge the liquid from the first nozzle and the second nozzle, and is configured to coat the liquid to the coating member.

Configuration 6

The coating apparatus according to one of Configurations 1 to 5, further comprising:

a coating bar configured to face a coating member, in the second state, the first nozzle discharge port and the second nozzle discharge port are configured to supply the liquid toward the coating bar.

Configuration 7

The coating apparatus according to Configuration 6, wherein the coating bar is configured to form a meniscus of the liquid between the coating bar and the coating member.

Configuration 8

The coating apparatus according to Configuration 6 or 7, wherein a surface of the coating bar includes unevenness, and a maximum height Rz of the unevenness is, for example, not less than 5 μm and not more than 50 μm.

Configuration 9

The coating apparatus according to one of Configurations 6 to 8, wherein the holder is configured to control a relative positional relationship between the first nozzle and the coating bar and a relative positional relationship between the second nozzle and the coating bar.

Configuration 10

The coating apparatus according to one of Configurations 6 to 9, further comprising:

a coating member holder holding the coating member; and a coating bar position controller, the coating bar position controller being configured to control a relative position between the coating bar and the coating member holder.

Configuration 11

The coating apparatus according to one of Configurations 6 to 8, wherein the first nozzle discharge port and the second nozzle discharge port are configured to coat the liquid to the coating member.

Configuration 12

The coating apparatus according to Configuration 5 or 11, further comprising:

a drying part, the drying part being configured to dry the liquid coated to the coating member.

Configuration 13

The coating apparatus according to one of Configurations 1 to 12, wherein the first nozzle is needle-shaped.

Configuration 14

The coating apparatus according to one of Configurations 1 to 13, wherein the first pipe includes inflow ports not less than 4, the first pipe includes a plurality of branch portions that branch two each.

Configuration 15

The coating apparatus according to one of Configurations 1 to 14, further comprising:

a second pipe including a second inflow port, a third outflow port, and a fourth outflow port;

a second pump configured to supply the liquid toward the second inflow port;

a third nozzle including a third nozzle inflow port and a third nozzle discharge port, the third nozzle inflow port being connected to the third outflow port, the third nozzle discharge port being configured to discharge the liquid passing through the second pipe; and a fourth nozzle including a fourth nozzle inflow port and a fourth nozzle discharge port, the fourth nozzle inflow port being connected to the fourth outflow port, the fourth nozzle discharge port being configured to discharge the liquid passing through the second pipe, the holder further holding the third nozzle and the fourth nozzle, in the first state, a height of the third nozzle discharge port and a height of the fourth nozzle discharge port being not less than a height of the second pipe, in the second state, the height of the third nozzle discharge port and the height of the fourth nozzle discharge port being lower than the height of the second pipe.

Configuration 16

The coating apparatus according to one of Configurations 1 to 15, further comprising:

a pipe height controller controlling the height of the first pipe.

Configuration 17

The coating apparatus according to one of Configurations 1 to 15, wherein the first pump includes a diaphragm pump.

Configuration 18

The coating apparatus according to one of Configurations 1 to 17, wherein the first pipe includes a check valve.

Configuration 19

The coating apparatus according to one of Configurations 1 to 18, wherein the holder includes a nozzle spacing controller, the nozzle spacing controller is configured to control spacing between the first nozzle and the second nozzle.

Configuration 20

A coating method, comprising:

using the coating apparatus according to one of Configurations 5 to 12, after the liquid is supplied to the first inflow port in the first state, and the gas in at least one of the above-mentioned first nozzle or the second nozzle is discharged from at least one of the first nozzle or the second nozzle, supplying the liquid to the first inflow port in the second state, discharging the liquid from the first nozzle and the second nozzle, and coating the liquid to the coating member.

According to the embodiment, a coating apparatus and a coating method are provided in which a uniform coated film can be formed.

Hereinabove, embodiments of the invention are described with reference to specific examples. However, the invention is not limited to these specific examples. One skilled in the art may similarly practice the invention by appropriately selecting specific configurations of components such as, for example, the pipes, the pumps, the nozzles, the holders, etc., included in the coating apparatuses from known art; and such practice is within the scope of the invention to the extent that similar effects can be obtained.

Furthermore, combinations of any two or more components of the specific examples within the extent of technical feasibility are within the scope of the invention to the extent that the purport of the invention is included.

Furthermore, all coating heads, coating apparatuses, and coating methods practicable by an appropriate design modification by one skilled in the art based on the coating heads, the coating apparatuses, and the coating methods described above as embodiments of the invention also are within the scope of the invention to the extent that the purport of the invention is included.

Moreover, various modifications and alterations within the spirit of the invention will be readily apparent to those skilled in the art; and all such modifications and alterations should be seen as being within the scope of the invention.

While certain embodiments of the inventions have been described, these embodiments have been presented by way of example only, and are not intended to limit the scope of the inventions. These novel embodiments may be embodied in a variety of other forms; and various omissions, substitutions, and changes may be made without departing from the spirit of the inventions. Such embodiments and their modifications are within the scope and spirit of the inventions and are included in the inventions described in the claims and their equivalents.

What is claimed is:

1. A coating apparatus, comprising:

a first pipe including a first inflow port, a first outflow port, and a second outflow port;

a first pump configured to supply liquid toward the first inflow port;

a first nozzle including a first nozzle inflow port and a first nozzle discharge port, the first nozzle inflow port being connected to the first outflow port, the first nozzle discharge port being configured to discharge the liquid passing through the first pipe;

a second nozzle including a second nozzle inflow port and a second discharge port, the second nozzle inflow port being connected to the second outflow port, the second nozzle discharge port being configured to discharge the liquid passing through the first pipe;

a holder holding the first nozzle and the second nozzle, the holder being configured to form a first state and a second state, in the first state, a height of the first nozzle discharge port and a height of the second nozzle discharge port being not less than a height of the first pipe, in the second state, the height of the first nozzle discharge port and the height of the second nozzle discharge port being lower than the height of the first pipe; and a coating bar configured to face a coating member, in the second state, the first nozzle discharge port and the second nozzle discharge port are configured to supply the liquid toward the coating bar.

2. The coating apparatus according to claim 1, wherein the first pump is configured to supply the liquid to the first inflow port in the first state to discharge the liquid from the first nozzle discharge port and the second nozzle discharge port.

3. The coating apparatus according to claim 2, further comprising:

a nozzle liquid receiving part, the nozzle liquid receiving part being configured to receive the liquid discharged from the first nozzle discharge port and the second nozzle discharge port.

4. The coating apparatus according to claim 1, wherein the first pump is configured to supply the liquid to the first inflow port in the first state to discharge the gas in at least one of the first nozzle or the second nozzle from at least one of the first nozzle or the second nozzle.

5. The coating apparatus according to claim 1, wherein the first pump is configured to supply the liquid to the first inflow port in the second state and discharge the liquid from the first nozzle and the second nozzle, and is configured to coat the liquid to the coating member.

6. The coating apparatus according to claim 1, wherein the coating bar is configured to form a meniscus of the liquid between the coating bar and the coating member.

7. The coating apparatus according to claim 1, wherein a surface of the coating bar includes unevenness, and a maximum height Rz of the unevenness is not less than 5 pm and not more than 50 pm.

8. The coating apparatus according to claim 1, wherein the holder is configured to control a relative positional relationship between the first nozzle and the coating bar and a relative positional relationship between the second nozzle and the coating bar.

9. The coating apparatus according to claim 1, further comprising: the coating member holder holding the coating member; and a coating bar position controller, the coating bar position controller being configured to control a relative position between the coating bar and the coating member holder.

10. The coating apparatus according to claim 1, wherein the first nozzle discharge port and the second nozzle discharge port are configured to coat the liquid to the coating member.

11. The coating apparatus according to claim 5, further comprising: a drying part, the drying part being configured to dry the liquid coated to the coating member.

12. The coating apparatus according to claim 1, wherein the first nozzle is needle-shaped.

13. The coating apparatus according to claim 1, wherein the first pipe includes inflow ports not less than four, the first pipe includes a plurality of branch portions that branch two each.

14. The coating apparatus according to claim 1, further comprising: a second pipe including a second inflow port, a third outflow port, and a fourth outflow port; a second pump configured to supply the liquid toward the second inflow port; a third nozzle including the third nozzle inflow port and a third nozzle discharge port, a third nozzle inflow port being connected to the third outflow port, the third nozzle discharge port being configured to discharge the liquid passing through the second pipe; and a fourth nozzle including a fourth nozzle inflow port and a fourth nozzle discharge port, the fourth nozzle inflow port being connected to the fourth outflow port, the fourth nozzle discharge port being configured to discharge the liquid passing through the second pipe, the holder further holding the third nozzle and the fourth nozzle, in the first state, a height of the third nozzle discharge port and a height of the fourth nozzle discharge port being not less than a height of the second pipe, in the second state, the height of the third nozzle discharge port and the height of the fourth nozzle discharge port being lower than the height of the second pipe.

15. The coating apparatus according to claim 1, further comprising: a pipe height controller controlling the height of the first pipe.

16. The coating apparatus according to claim 1, wherein the first pump includes a diaphragm pump.

17. The coating apparatus according to claim 1, wherein the first pipe includes a check valve.

18. The coating apparatus according to claim 1, wherein the holder includes a nozzle spacing controller, the nozzle spacing controller is configured to control spacing between the first nozzle and the second nozzle.

19. A coating method, comprising: using the coating apparatus according to claim 5, after the liquid is supplied to the first inflow port in the first state, and the gas in at least one of the above-mentioned first nozzle or the second nozzle is discharged from at least one of the first nozzle or the second nozzle, supplying the liquid to the first inflow port in the second state, discharging the liquid from the first nozzle and the second nozzle, and coating the liquid to the coating member.

* * * * *